United States Patent [19]
Inoue et al.

[11] Patent Number: 6,159,431
[45] Date of Patent: Dec. 12, 2000

[54] CERAMIC HONEYCOMB STRUCTURAL BODY

[75] Inventors: Satoru Inoue, Hazu-Gun; Koichi Ikeshima, Okazaki, both of Japan

[73] Assignee: NGK Insulators, Ltd., Japan

[21] Appl. No.: 09/042,741

[22] Filed: Mar. 17, 1998

[30] Foreign Application Priority Data

Mar. 28, 1997 [JP] Japan ................................ 9-077116

[51] Int. Cl.⁷ ............................ B01D 53/34; B01J 35/04; F01N 3/28
[52] U.S. Cl. ................ 422/180; 422/177; 502/439; 502/527.19; 428/116; 428/118
[58] Field of Search ................. 422/177, 180; 428/116, 188, 118; 502/439, 527.18, 527.19

[56] References Cited

U.S. PATENT DOCUMENTS

| | | | |
|---|---|---|---|
| 4,233,351 | 11/1980 | Okumura et al. | 428/116 |
| 4,335,023 | 6/1982 | Dettling et al. | 422/180 |
| 5,456,965 | 10/1995 | Machida et al. | 428/116 |

FOREIGN PATENT DOCUMENTS

| | | |
|---|---|---|
| 1289544 | 9/1991 | Canada . |
| 0 241 269 A2 | 10/1987 | European Pat. Off. . |
| 49-113789 | 10/1974 | Japan . |
| 54-110189 | 8/1979 | Japan . |
| 54-150406 | 11/1979 | Japan . |
| 55-147154 | 11/1980 | Japan . |
| 56-147367 | 11/1981 | Japan . |
| 2 071 640 | 9/1981 | United Kingdom . |

*Primary Examiner*—Hien Tran
*Attorney, Agent, or Firm*—Parkhurst & Wendel, LLP

[57] ABSTRACT

In a ceramic honeycomb structural body having a plurality of open-ended cells defined by cell walls, a reinforcing portion is formed in each corner part of an open-ended cell existing in a second zone outside a first zone inclusive of a center on a plane perpendicular to the open-ended cells.

9 Claims, 4 Drawing Sheets

FIG_3
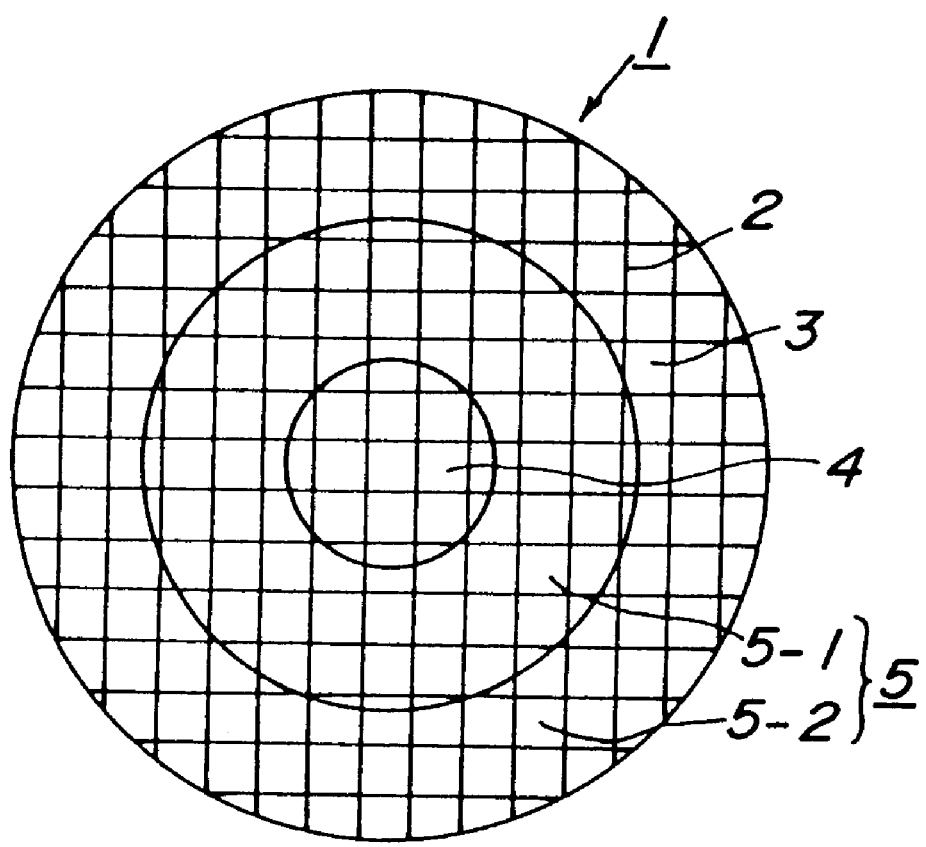

FIG_4
PRIOR ART
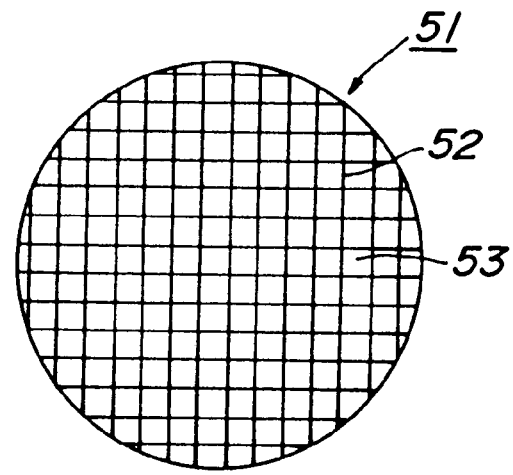
FIG_5
PRIOR ART
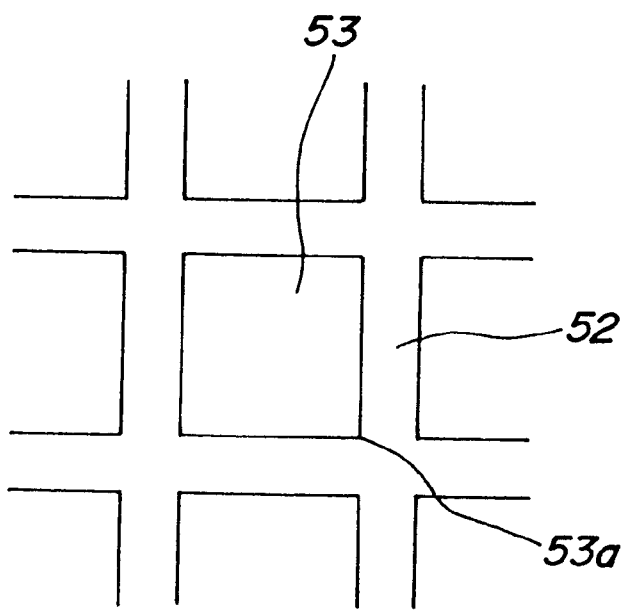

CERAMIC HONEYCOMB STRUCTURAL BODY

BACKGROUND OF THE INVENTION

1. Field of the Invention

This invention relates to a ceramic honeycomb structural body having a plurality of open-ended cells defined by cell walls.

2. Description of Related Art

A filter comprised of a ceramic honeycomb structural body has previously been used as a catalyst substrate or a fine particle filter for purifying an exhaust gas of an internal combustion engine, or a filter used for purifying or deodorizing a combustion gas from petroleum or various gases as a fuel. FIG. 4 is a sectional view perpendicular to open-ended cells illustrating an embodiment of the conventional ceramic honeycomb structural body. In the embodiment of FIG. 4, the ceramic honeycomb structural body 51 of a columnar shape made from a material such as cordierite or the like comprises a plurality of open-ended cells 53 defined by cell walls 52 and extending parallel to each other. Part of the open-ended cells 53 is shown enlarged in FIG. 5, open-ended cells 53 in the conventional ceramic honeycomb structural body 51 have, in many cases, a square shape on a surface perpendicular to the longitudinal direction of the open-ended cells 53, while each of corner 53a has a right-angled shape crossing surfaces of the cell walls 52 to each other.

In the ceramic honeycomb structural body 51 particularly used as a catalyst substrate for the purifying the exhaust gas of the internal combustion engine, it is recently required to have thinner partition cell walls 52 and a greater number of open-ended cells 53 so as to satisfy conditions such as an increase of purification efficiency of the exhaust gas, a reduction of pressure loss, use at a higher operating temperature and the like. The ceramic honeycomb structural bodies having thinner cell walls 52 in accordance with the aforementioned requirement have such problems that the structural body is liable to collapse due to thinner cell wall 52 and the mechanical strength is low. Also, there are problems that it is very difficult to manufacture a jig (die) required for the production of the structural body and the number of the manufacturing steps is numerous. Further, is difficult to obtain a jig at a high working accuracy and the cost and delivery time are increased, and the like. Furthermore, even in the forming of the structural body, it is important to prevent the collapse and deformation at the forming step.

In order to improve the mechanical strength of the ceramic honeycomb structural body 51, there have hitherto been known techniques disclosed in JP-A-54-110189 and JP-A-54-150406. According to these techniques, the thickness of the cell wall located at an outer peripheral side of the ceramic honeycomb structural body 51 is made thicker than that located at a central side thereof, but there are caused problems that the thickening of the cell wall 52 narrows an effective open-ended cell 53 and increases the weight of the structural body to lower the thermal shock resistance.

Further, as a technique relating to four corner parts 53a of each open-ended cell 53 in the ceramic honeycomb structural body 51, there have been known techniques disclosed in JP-A-49-113789 and JP-A-56-147637. According to these techniques, a round or straight swollen portion or fillet portion is disposed on each corner part 53a of all open-ended cells 53 in the ceramic honeycomb structural body 51. In this case, however, there is a problem that it is very difficult to manufacture a forming jig used for producing the ceramic honeycomb structural body 51 having thinner cell walls 52. This problem becomes conspicuous when the thickness of the cell wall is thinner (not more than 0.15 mm). Furthermore, there is caused a problem that a rate of lowering the mechanical strength of the structural body or causing the collapse in the forming is increased.

SUMMARY OF THE INVENTION

It is, therefore, an object of the invention to solve the aforementioned problems and to provide a ceramic honeycomb structural body capable of providing a sufficient mechanical strength even in the thinning of the cell wall and lessening the burden such as the manufacture of the forming jig or the like.

According to the invention, there is the provision of a ceramic honeycomb structural body having a plurality of open-ended cells defined by cell walls, the improvement wherein a reinforcing portion is formed on each corner part of an open-ended cell existing in a second zone outside a first zone inclusive of a center in a plane perpendicular to the open-ended cells.

In a preferable embodiment of the invention, the reinforcing portion formed in each corner part of the open-ended cell existing in the second zone defined as an outer portion of the ceramic honeycomb structural body is rendered into a round or straight-shaped fillet portion, whereby the mechanical strength and shape retention of the ceramic honeycomb structural body having thin cell walls can be improved. The reason why each of the corner parts of the open-ended cell existing in the second zone is reinforced with the reinforcing portion, preferably the round or straight-shaped fillet portion is due to the fact that compressive force is frequently applied from an exterior in the handling of the structural body or in use as a catalyst substrate and largely exerts on the outer peripheral portion of the ceramic honeycomb structural body.

Further, the forming jig used for manufacturing the ceramic honeycomb structural body of the above structure is manufactured by subjecting portions of the jig corresponding to the cell walls to an electrospark machining, placing electrodes at interconnected points of these portions and then conducting an electrolytic machining under given conditions to form portions corresponding to the reinforcing portions in the corner parts of the open-ended cell, preferably the round or straight-shaped filler portions. For this end, if there are many portions required for the formation of the round or straight-shaped fillet portion, the number of the manufacturing steps and the cost are increased and the delivery time becomes long. In the invention, it is not necessary to form the round or straight-shaped fillet portion in each corner part of all open-ended cells, and the round or straight-shaped fillet portion is merely formed in each corner part of the open-ended cell existing in the second zone, so that it is possible to decrease the number of manufacturing steps of the forming jig and hence reduce the cost and delivery time.

BRIEF DESCRIPTION OF THE DRAWINGS

The invention will be described with reference to the accompanying drawings, wherein:

FIG. 3 is a schematically sectional view of another embodiment of the ceramic honeycomb structural body according to the invention;

FIG. 4 is a schematically sectional view of an embodiment of the conventional ceramic honeycomb structural body; and FIG. 5 is an enlarged view of a part of the structural body shown in FIG. 4.

DESCRIPTION OF PREFERRED EMBODIMENTS

Figure 1:
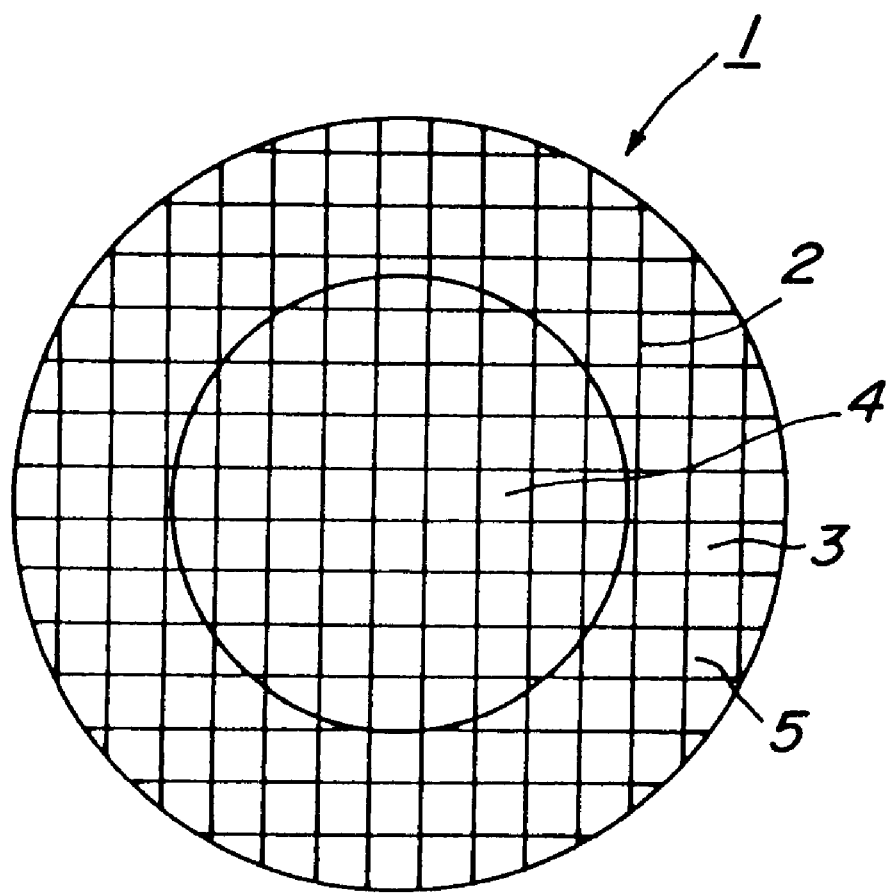
FIG. 1 is a schematically sectional view of an embodiment of the ceramic honeycomb structural body according to the invention.

FIG. 1 sectionally shows a first embodiment of the ceramic honeycomb structural body according to the invention in a direction perpendicular to open-ended cells thereof. In the embodiment of FIG. 1, a ceramic honeycomb structural body 1 of a columnar shape made from a material such as cordierite or the like comprises a plurality of open-ended cells 3 defined by interconnected walls or cell walls 2 and extending parallel to each other. According to the invention, in a plane perpendicular to the open-ended cells 3 shown in FIG. 1, the shape of the open-ended cell 3 existing in a first zone 4 inclusive of a center is rectangular like the conventional one. The open-ended cell 3 existing in a doughnut-shaped second zone 5 located outside the first zone 4 is a rectangular shape provided at each corner part thereof with a reinforcing portion, preferably a rounded or straight-shaped fillet portion.

Figure 2A:
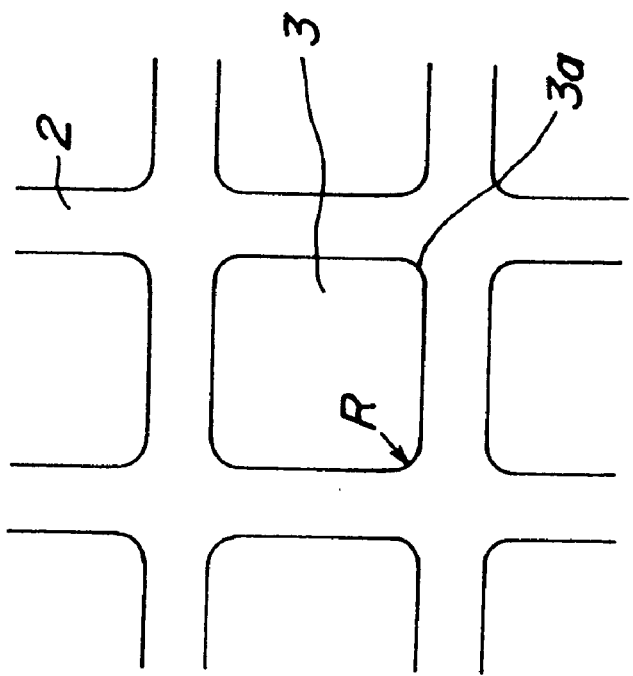
FIGS. 2(*a*) and 2(*b*) are is an enlarged views of parts of the structural body shown in FIG. 1.
Figure 2B:
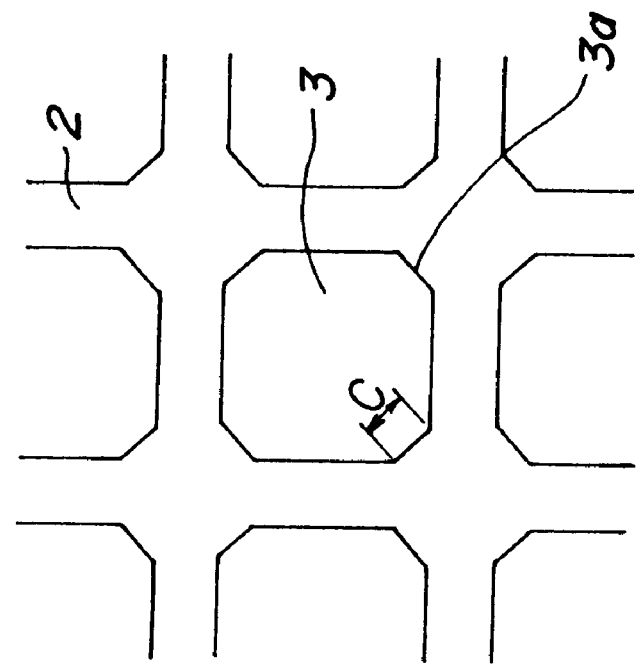

FIGS. 2a, 2b show an enlarged part of the second zone 5 shown in FIG. 1 illustrating the shape of the reinforcing portion formed in the four corner parts according to the invention. FIG. 2a is a case showing a round shape, wherein the open-ended cell 3 is a rectangular shape in a plane perpendicular to the open-ended cells and at the same time each of four corner parts 3a as an interconnected point of the rectangle has a round shape having a radius of curvature R. FIG. 2b is a case showing a straight shape, wherein the open-ended cell 3 is a rectangular shape in a plane perpendicular to the open-ended cells and at the same time each of four corner parts 3a as an interconnected point of the rectangle is reinforced with a straight-shaped reinforcing portion having a width C.

In the embodiment of FIGS. 1, 2a and 2b, each of the four corner parts 3a of the open-ended cell 3 is provided with the reinforcing portion, preferably the round or straight-shaped reinforcing portion, so that there can easily be formed the ceramic honeycomb structural body having thin cell walls 2 and a sufficient mechanical strength. And also, the range of forming the reinforcing portion in the corner part 3a is limited to the second zone 5 located outside the first zone, so that the number of the manufacturing steps for the jig required in the forming can be diminished and the reductions of the cost in the manufacture of the jig and the delivery time can be attained.

Further, the round or straight shape in the corner part 3a of the open-ended cell 3 hardly exerts upon the hydraulic radius of the open-ended cell 3, so that there is no increase of pressure loss in its use. Moreover, the round or straight shape in the corner part 3a of the open-ended cell 3 decreases a void portion of the corner part 3a, so that an amount of an expensive catalyst to be supported on the surface of the cell wall can be decreased, and as a result the cost of a final product can be reduced.

FIG. 3 is a schematically sectional view of another embodiment of the ceramic honeycomb structural body according to the invention in a plane perpendicular to the open-ended cells 3 like FIG. 1. In the embodiment of FIG. 3, the second zone 5 is divided into two inner and outer sub-zones 5-1, 5-2 on a concentric circle so as to make the size of the round or straight shape in each corner part 3a of the open-ended cell 3 existing in each of sub-zones 5-1 and 5-2 larger toward the outer peripheral portion of the ceramic honeycomb structural body 1. That is, the size of the round or straight shape in the inner sub-zone 5-1 is made smaller than that in the outer sub-zone 5-2. Of course, the division number in the second zone is not limited to be 2 and may be 3 or more. Even in the latter case, it is needless to say that it is necessary to make the size of the round or straight shape in each corner part 3a of the open-ended cell 3 existing in each of the divided sub-zones larger toward the outer peripheral portion of the ceramic honeycomb structural body 1. In an additional embodiment, the cell wall thickness is not more than 0.15 mm.

The following examples are given in illustration of the invention and are not intended as limitations thereof.

EXAMPLE 1

A ceramic honeycomb structural body 1 of 100 mm in diameter and 150 mm in length comprising a plurality of open-ended cells 3 defined by cell walls 2 of 0.1 mm in thickness and 1.27 mm in interconnected length is formed using a jig as sample Nos. 1–6 having a shape, a size (width or radius of curvature) and a range of a corner part 3a as shown in Table 1. Then, an influence based on the shape of the corner part is examined by visually observing the presence or absence of collapse in the forming of the ceramic honeycomb structural body 1. The results are also shown in Table 1. As seen from the results of Table 1, the sample Nos. 2–6 having the round-shaped corner part 3a as an invention example are not collapsed in the forming and can conduct the good forming as compared with sample No. 1 as the conventional example. Among the invention examples, it has been found that the examples having a radius of curvature of the round shape of not less than 0.05 mm are excellent.

TABLE 1

| Sample No. | 1 | 2 | 3 | 4 | 5 | 6 |
|---|---|---|---|---|---|---|
| Shape of corner part | right angle | round | round | round | round | round |
| Size of corner part (mm) | 0 | 0.03 | 0.05 | 0.10 | 0.15 | 0.20 |
| Range of second zone (length from outer periphery (mm)) | 25 | 25 | 25 | 25 | 25 | 25 |
| Collapse in forming | X | Δ | ◯ | ◯ | ◯ | ◯ | note) ◯: no collapse, Δ slight collapse, X: collapse, fail as product

EXAMPLE 2

A ceramic honeycomb structural body 1 having the same size as in Example 1 as sample Nos. 11–15 is formed by using a jig so as to change a length of a second zone 5 containing an open-ended cell 3 provided with a round-shaped corner part 3a with a radius of curvature of 0.1 mm from an outer periphery of the structural body as shown in Table 2. Then, an influence based on the existing range of the second zone 5 is examined by visually observing the presence or absence of collapse in the forming of the ceramic honeycomb structural body 1. The results are also shown in Table 2. As seen from the results of Table 2, the sample Nos. 12–15 as the invention examples are not collapsed in the forming and can conduct the good forming as compared with sample No. 11 as the conventional example. Among the invention examples, it has been found that the examples having the length of the second zone 5 from the outer periphery of the second zone of not less than 6 mm are excellent.

TABLE 2

| Sample No. | 11 | 12 | 13 | 14 | 15 |
| --- | --- | --- | --- | --- | --- |
| Shape and size of corner part (mm) | round 0.1 | round 0.1 | round 0.1 | round 0.1 | round 0.1 |
| Range of second zone (length from outer periphery (mm)) | 0 | 4 | 6 | 25 | 50 |
| collapse in forming | X | Δ | ○ | ○ | ○ |

EXAMPLE 3

With respect to the sample Nos. 2–6 in Example 1 and the sample Nos. 12–15 in Example 2, the resulting structural body is actually fired under the same condition to form a fired body, and then the compression strength and thermal shock resistance are measured with respect to the fired body. The thermal shock resistance is evaluated as follows. That is, a test specimen of the fired body cooled to room temperature is placed in an electric furnace held at a temperature of room temperature +700° C. and kept at this temperature for 20 minutes and thereafter taken out from the electric furnace and cooled to room temperature. Then, the test specimen is considered as an acceptable product only when no crack is observed and a metallic sound is heard by striking the outer peripheral portion of the specimen with a fine metal rod while observing its appearance. Next, the same procedure as described above is continued until the specimen as an acceptable product becomes unacceptable while raising the temperature inside the electric furnace every 50° C. The thermal shock resistance is represented by a temperature value obtained by subtracting room temperature from a maximum temperature in acceptance. On the other hand, the compression strength is a compression strength at breakage when hydrostatic pressure load is isotropically applied to the honeycomb structural body and is represented by a pressure value when the breakage is caused. In any case, the value of each property is an average when the number of the specimen is five. The results are shown in Tables 3 and 4.

TABLE 3

| Sample No. | 2 | 3 | 4 | 5 | 6 |
| --- | --- | --- | --- | --- | --- |
| Size of round shape (mm) | 0.03 | 0.05 | 0.10 | 0.15 | 0.20 |
| Compression strength (kg/cm$^2$) | 5 | 68 | 92 | 103 | 120 |
| Thermal shock resistance (° C.) | 920 | 900 | 900 | 870 | 750 |

TABLE 4

| Sample No. | 12 | 13 | 14 | 15 |
| --- | --- | --- | --- | --- |
| Range of second zone (length from outer periphery (mm)) | 4 | 6 | 25 | 50 |
| Compression strength (kg/cm$^2$) | 5 | 68 | 92 | 103 |
| Thermal shock resistance (° C.) | 900 | 900 | 900 | 900 |

As seen from the results of Table 3, the sample Nos. 3–6 having the size of the round shape of not less than 0.05 mm are excellent in the compression strength as compared with the sample No. 2 having the size of the round shape of 0.03 mm. As seen from the results of Table 4, the sample Nos. 13–15 having the range of the second zone of not less than 6 mm from the outer periphery are excellent in both the compression strength and thermal shock resistance as compared with the sample No. 12 having the range of the second zone of 4 mm.

The invention is not limited to the aforementioned examples and various modifications and changes can be made. For instance, although the reinforcing portion formed in the corner part is a round or straight shape, the other shape thereof may be adopted as far as the purpose of reinforcement can be attained. For example, a round shape convexly extending toward the center of the open-ended cell 3 may be used as opposed to the aforementioned round shape. And also, although there is described the embodiment wherein the second zone 5 is divided into plural sub-zones and the size of the round or straight shape in each sub-zone is made gradually and intermittently large from the center toward the outer periphery, the similar result can be obtained by gradually and continuously making large the size of the round or straight shape of the corner part in the second zone 5 as a whole from the center toward the outer periphery without dividing the second zone 5 into sub-zones. Furthermore, although the sectional shape of the open-ended cell is described as a square, there may be used, for example, triangle, rectangle, hexagon or a combination thereof.

As mentioned above, according to the invention, each corner part of the open-ended cell existing in the second zone defined as an outer portion of the ceramic honeycomb structural body is provided with the reinforcing portion, preferably the round or straight-shaped fillet portion, so that the mechanical strength and shape retention of the ceramic honeycomb structural body having thin cell walls can be improved. Furthermore, the reinforcing portion is disposed in each corner part of the open-ended cell existing in only the second zone without disposing all corner parts of all open-ended cells, so that it is possible to decrease the number of the manufacturing steps for the forming jig and hence reduce the cost and delivery time.

What is claimed is:

1. In a ceramic honeycomb structural body having a plurality of open-ended cells defined by cell walls, the improvement comprising a reinforcing portion extending between adjacent cell walls in each corner of an open-ended cell existing in a second zone outside a first zone which is inclusive of a center in a plane perpendicular to the open-ended cells, said reinforcing portions not being in the first zone.

2. A ceramic honeycomb structural body according to claim 1, wherein the reinforcing portion is a round or straight-shaped fillet portion.

3. A ceramic honeycomb structural body according to claim 2, wherein the reinforcing portion is a straight-shaped fillet portion and the second zone is divided into plural sub-zones and a width of the straight-shaped reinforcing portion existing in each of these sub-zones is larger toward an outer periphery of the ceramic honeycomb structural body.

4. A ceramic honeycomb structural body according to claim 3, wherein the width of the straight-shaped reinforcing portion existing in the second zone is gradually larger cell by cell toward the outer periphery of the ceramic honeycomb structural body.

5. A ceramic honeycomb structural body according to claim 3, wherein the width of the straight-shaped reinforcing portion existing in the second zone is within a range of 0.05–0.15 mm.

6. A ceramic honeycomb structural body according to claim 1, wherein the cell wall has a thickness of not more than 0.15 mm.

7. A ceramic honeycomb structural body according to claim 2, wherein the reinforcing portion is a round fillet portion and the second zone is divided into plural sub-zones and a radius of curvature of the rounded reinforcing portions existing in cells of each of these sub-zones is larger toward an outer periphery of the ceramic honeycomb structural body.

8. A ceramic honeycomb structural body according to claim 7, wherein a radius of curvature of the rounded reinforcing portions existing in the second zone is gradually larger toward the outer periphery of the ceramic honeycomb structural body.

9. A ceramic honeycomb structural body according to claim 7, wherein the radius of curvature of the rounded reinforcing portions existing in the second zone is within a range of 0.05–0.15 mm.

* * * * *